United States Patent
Mathe et al.

(10) Patent No.: US 10,788,822 B2
(45) Date of Patent: Sep. 29, 2020

(54) SYSTEM FOR SELECTING DRIVING MANEUVERS OF A VEHICLE FOR AUTOMATED DRIVING

(71) Applicant: Continental Automotive GmbH, Hannover (DE)

(72) Inventors: Benjamin Mathe, Mainz (DE); Katrin Wenzel, Alsbach-Haehnlein (DE); Heidi von Bychowski, Bad Homburg (DE); Guido Meier-Arendt, Langen (DE)

(73) Assignee: Continental Automotive GmbH, Hannover (DE)

( * ) Notice: Subject to any disclaimer, the term of this patent is extended or adjusted under 35 U.S.C. 154(b) by 236 days.

(21) Appl. No.: 16/046,688

(22) Filed: Jul. 26, 2018

(65) Prior Publication Data

US 2019/0033855 A1  Jan. 31, 2019

(30) Foreign Application Priority Data

Jul. 27, 2017  (DE) .................. 10 2017 212 992

(51) Int. Cl.
*G05D 1/00* (2006.01)
*B62D 15/02* (2006.01)
(Continued)

(52) U.S. Cl.
CPC ........... *G05D 1/0016* (2013.01); *B60W 50/08* (2013.01); *B60W 50/14* (2013.01); *B62D 15/025* (2013.01);
(Continued)

(58) Field of Classification Search
CPC ................ G05D 1/0016; G05D 1/021; G05D 2201/0213; B60W 50/08; B60W 50/14;
(Continued)

(56) References Cited

U.S. PATENT DOCUMENTS 5,113,185 A  5/1992  Ichikawa
6,456,934 B1 *  9/2002  Matsunaga ........ G01C 21/3492
701/411
(Continued)

FOREIGN PATENT DOCUMENTS

DE  3315613 A1  11/1983
DE  102010022620 A1  12/2011
(Continued)

OTHER PUBLICATIONS

Search Report dated Dec. 19, 2018 from corresponding European Patent Application No. 18178175.8.
(Continued)

*Primary Examiner* — Calvin Cheung (57) ABSTRACT

A system for selecting driving maneuvers of a vehicle for automated driving comprises a display device for displaying a route of the vehicle in different presentation types, a selection device for selecting one of the presentation types for the route, and a control device for controlling the display device. The control device is designed to present different possible driving maneuvers for selection on the display device on the basis of the presentation type selected for the route. The selection device is designed to select one of the different possible driving maneuvers for performance during automated driving.

17 Claims, 4 Drawing Sheets

(51) Int. Cl.
*B60W 50/08* (2020.01)
*G01C 21/36* (2006.01)
*B60W 50/14* (2020.01)
*G05D 1/02* (2020.01)

(52) U.S. Cl.
CPC ....... *B62D 15/0255* (2013.01); *G01C 21/367* (2013.01); *G01C 21/3614* (2013.01); *G01C 21/3626* (2013.01); *G01C 21/3664* (2013.01); *G05D 1/021* (2013.01); *G05D 2201/0213* (2013.01)

(58) Field of Classification Search
CPC .............. B62D 15/025; B62D 15/0255; G01C 21/3614; G01C 21/3626; G01C 21/3664; G01C 21/367
See application file for complete search history.

(56) References Cited

U.S. PATENT DOCUMENTS

| | | | | |
|---|---|---|---|---|
| 7,283,906 | B1* | 10/2007 | Gearhart | G08G 1/096827 340/995.14 |
| 9,222,795 | B1* | 12/2015 | Gerlach | G01C 21/3632 |
| 10,268,191 | B1* | 4/2019 | Lockwood | G05D 1/0022 |
| 2009/0149297 | A1* | 6/2009 | Walser | F16D 48/06 477/125 |
| 2012/0173069 | A1* | 7/2012 | Tsimhoni | G01C 21/365 701/25 |
| 2013/0179023 | A1* | 7/2013 | Schmidt | B60W 50/14 701/23 |
| 2015/0032322 | A1* | 1/2015 | Wimmer | B60K 35/00 701/23 |
| 2016/0231743 | A1* | 8/2016 | Bendewald | B60W 30/16 |
| 2017/0136878 | A1* | 5/2017 | Frank | B60W 50/16 |
| 2017/0284812 | A1* | 10/2017 | Kim | G01C 21/3658 |
| 2017/0334459 | A1* | 11/2017 | Mcnew | B60W 50/14 |
| 2017/0361853 | A1* | 12/2017 | Nagy | B60W 30/14 |
| 2018/0065664 | A1* | 3/2018 | Watanabe | G05D 1/0212 |
| 2019/0094040 | A1* | 3/2019 | Lewis | G01S 17/89 |
| 2019/0161086 | A1* | 5/2019 | Bettger | B60W 50/10 |
| 2019/0164424 | A1* | 5/2019 | Kleen | G08G 1/096725 |
| 2019/0193734 | A1* | 6/2019 | Ekl | G06N 5/045 |
| 2019/0375429 | A1* | 12/2019 | Gardner | B60W 50/087 |

FOREIGN PATENT DOCUMENTS

| | | | |
|---|---|---|---|
| DE | 102010022623 | A1 | 12/2011 |
| EP | 2196773 | A1 | 6/2010 |
| EP | 2669109 | B1 | 3/2015 |

OTHER PUBLICATIONS

Office Action dated Mar. 7, 2018 from corresponding German Patent Application No. 10 2017 212 992.1.
Machine Translation of DE 10 2010 022620 A1.
Machine Translation of EP 2669109 B1.
English Translation of Office Action dated Mar. 7, 2018 from corresponding German Patent Application No. 10 2017 212 992.1.

* cited by examiner

SYSTEM FOR SELECTING DRIVING MANEUVERS OF A VEHICLE FOR AUTOMATED DRIVING

BACKGROUND

The invention relates to a system for selecting driving maneuvers of a vehicle for automated driving.

A system for automated driving allows driving from a starting point to a destination, wherein the vehicle can drive the entire route or at least individual route sections in an autonomous manner to the greatest possible extent. However, a driver is intended to have the opportunity to intervene in the driving behavior of the autonomously driving vehicle or to change the driving style of the autonomously driving vehicle. In particular, certain driving maneuvers are intended to be selected by a vehicle occupant during the journey and are then carried out by the autonomously driving vehicle. The possible driving maneuvers include, for example, a lane change to the left or right, the overtaking of a vehicle in front, the approaching of a rest stop or the next gas station.

BRIEF SUMMARY

An objective of the present invention is to specify a system for selecting driving maneuvers of a vehicle for automated driving, which system provides a user with a simple opportunity to select a large number of different driving maneuvers to be carried out by the autonomously driving vehicle.

The object is achieved with a system for selecting driving maneuvers of a vehicle for automated driving according to the features of patent claim 1.

The system for selecting driving maneuvers of a vehicle for automated driving comprises, in particular, a display device for displaying a route of the vehicle in different presentation types. The system also comprises a selection device for selecting one of the presentation types for the route, and a control device for controlling the display device. The control device is designed to present different possible driving maneuvers for selection on the display device on the basis of the presentation type selected for the route. The selection device is designed to select one of the different possible driving maneuvers for performance during automated driving.

The display device may be, for example, a screen/display, in particular an FDC (Full Digital Cluster) display device. The display device can be operated in a presentation mode for presenting the route in the different presentation types or can be operated in an input mode for selecting one of the driving maneuvers. The display device can be changed over from the presentation mode to the input mode and vice versa by means of the selection device, for example.

If the display device is operated in the presentation mode, the route is presented on the display device without any inputs being able to be made. In particular, no driving maneuvers can be selected. In the presentation mode, the route can be presented in the different presentation types on the display device. The different presentation types for the route may be, for example, different magnification levels/zoom levels for the route, in which the route can be presented on the display device.

In one possible presentation type of the presentation mode, it is possible to present, for example, an immediate environment around a current vehicle position (environment visualization). In a further presentation type in the presentation mode, a larger section of the route, for example a route section of several kilometers, is presented on the display device (navigation map presentation). In a further presentation type for the route with the minimum magnification level, the entire route is presented on the display device in the presentation mode.

In order to select a possible driving maneuver, a change is made from the presentation mode to the input mode. For this purpose, the input mode is selected using the selection device. In the input mode of the display device, different possible driving maneuvers can now be selected on the basis of the presentation type previously set in the presentation mode.

For example, in the input mode assigned to the environment visualization, it is possible to carry out driving maneuvers which are intended to be carried out shortly or immediately after they have been selected. These include, for example, an operation of overtaking a vehicle traveling in front. In the input or maneuver mode assigned to the navigation map presentation in the presentation mode, it is possible to select driving maneuvers which are intended to be carried out at a position of the presented route section. These include maneuvers which are intended to be carried out only at a distance of some kilometers from the current position. In the input/maneuver mode assigned to the entire route presentation, it is possible to select driving maneuvers which are intended to be carried out along the entire route or relate to the entire route.

The specified system for selecting driving maneuvers of a vehicle for automated driving makes it possible to implement a multimodal display and operating concept with respect to an adaptive driving maneuver selection behavior. In particular, a user of the system is provided with a simple opportunity to be able to select and commission a large number of different driving maneuvers using a dedicated input medium and a display device, for example a display (screen) of a full digital cluster.

The system has intuitive display and operating logic and fast maneuver selection and commissioning, in particular with short dialog times. On account of the different operating modes of the display device in a presentation mode for presenting the route in the different presentation types and in an input mode for selecting one of the possible driving maneuvers, it is clearly indicated to a user whether only information relating to the route is presented on the display device or whether a possible driving maneuver can be selected and commissioned by means of an active input by the user.

The concept implemented with the system for selecting driving maneuvers during automated driving relates to the principle of the so-called focus switch level (FSL). According to this concept, there are various focus switch levels (presentation types) for a route, which can be selected by the user during automated driving with the aid of the selection device, that is to say a dedicated input medium. The presentation types for the route which are displayed on the display device may differ in the degree of detail based on the map presentation (driven route presentation). Depending on the selection of the focus switch level, that is to say the presentation type or the magnification level selected for a route, the system provides a user with context-related possible driving maneuvers.

An adaptive human-machine interface output strategy for selecting driving maneuvers during automated driving is implemented with the aid of the system. The system provides, in particular, a reduced and context-related maneuver selection strategy in conjunction with intuitively quickly learnable display and operating logic. Depending on the presentation type, in particular magnification level/zoom level, for the route, the driving maneuver selection can be displayed on different visual output media, for example an augmented reality HUD (head-up display), an LED matrix, VR glasses, etc.

The invention is explained in more detail below on the basis of figures which show exemplary embodiments of the present invention.

DETAILED DESCRIPTION

Figure 1:
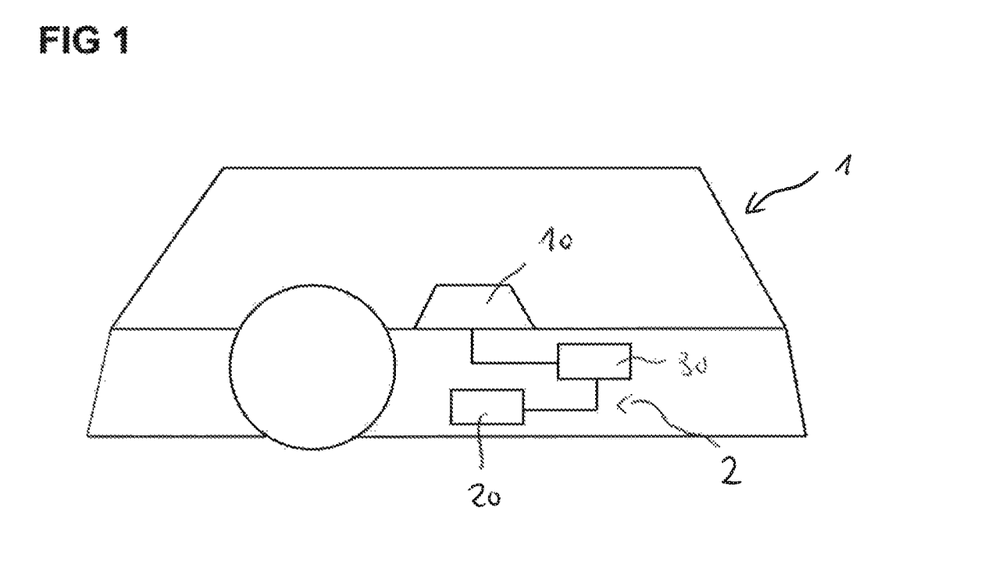
FIG. 1 shows a vehicle having a system for selecting driving maneuvers during automated driving.

FIG. 1 shows a vehicle 1 having a system 2 for selecting driving maneuvers of the vehicle 1 for automated driving. The system comprises a display device 10 for displaying a route of the vehicle in different presentation types. The display device 10 may be, for example, a screen, in particular a display of an FDC (Full Digital Cluster). The system 2 also has a selection device 20 for selecting one of the presentation types for the route of the vehicle 1 during automated driving, and a control device 30 for controlling the display device 10. The control device 30 is designed to present different possible driving maneuvers for selection on the display device 10 on the basis of the presentation type selected for the route of the vehicle 1. The selection device 20 is designed to select one of the possible driving maneuvers for performance during automated driving.

According to one possible embodiment of the system 2, the display device 10 can be operated in a presentation mode 11 for presenting a route 50 in different presentation types and in an input mode 12 for selecting one of the possible driving maneuvers.

Figure 2A:
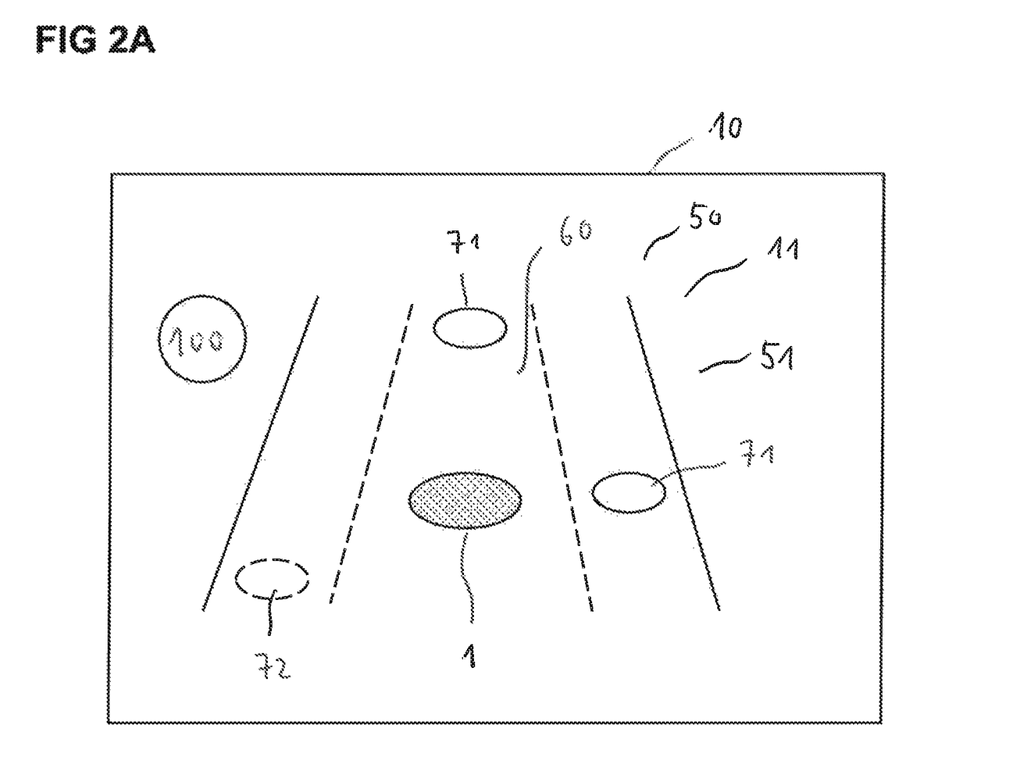
FIG. 2A shows the display of a route in a first presentation type on a display device in the presentation mode.

FIG. 2A shows a presentation of a route 50 of the vehicle 1 during automated driving in a first presentation type on the display device 10. The route 50 is presented in the first presentation type (focus switch level 1) in a first magnification level, with the result that a comparatively short route section 51, for example a route section with a length of less than one kilometer, is displayed. In the first magnification level, only a small section of the route is presented with a high degree of detail on the display device 10, for example. In particular, the immediate environment around a current vehicle position is displayed (environment visualization).

The vehicle 1 is presented on a road 60, for example. Objects 71 beside or in front of the vehicle 1 and objects 72 behind the vehicle 1 are also displayed. The maximum possible speed of 100 km/h is also displayed in the form of a sign.

Figure 2B:
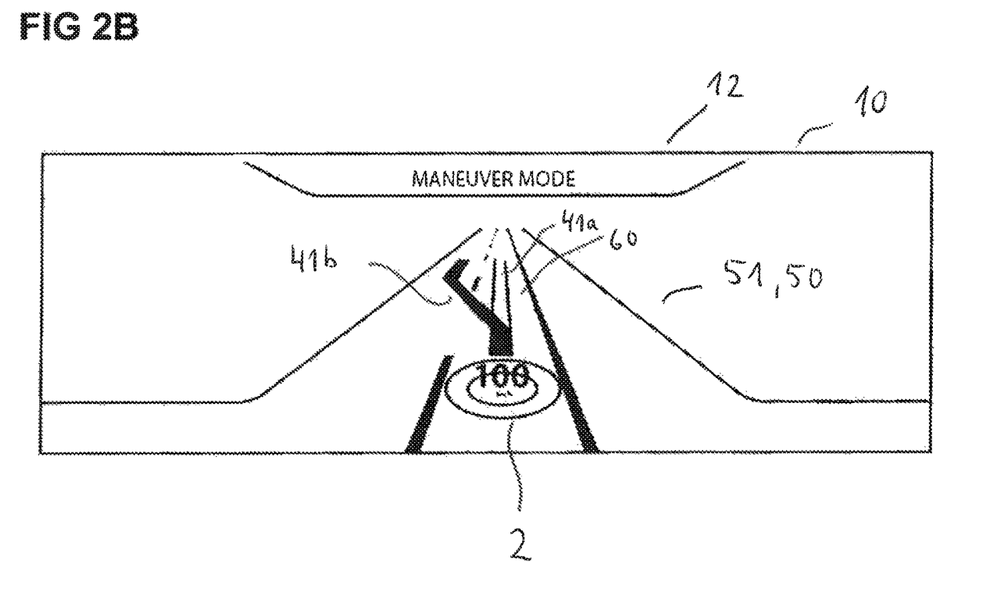
FIG. 2B shows a display of possible driving maneuvers for the first presentation type for the route on the display device in the input mode.

Whereas the display device 10 in FIG. 2A is operated in the presentation mode 11 in which only the environment around a current vehicle position is visualized, the display device 10 in FIG. 2B is operated in the input mode 12. In the input mode 12, different driving maneuvers 41a, 41b for selection and performance are offered to a user by the system. If the driving maneuver 41a is selected, the vehicle continues to drive straight ahead in the current lane. In contrast, if the driving maneuver 41b is selected, a lane change is carried out in order to overtake a vehicle traveling in front, for example.

In the first presentation type or the first magnification level for the route 50 on the display device 10, only those driving maneuvers which can be carried out in an immediate period, in particular immediately, but at least shortly, after they have been selected, for example in less than one minute, are offered in the input mode/maneuver mode 12. These include, for example, the lane change for an overtaking operation shown in FIG. 2B.

Figure 3A:
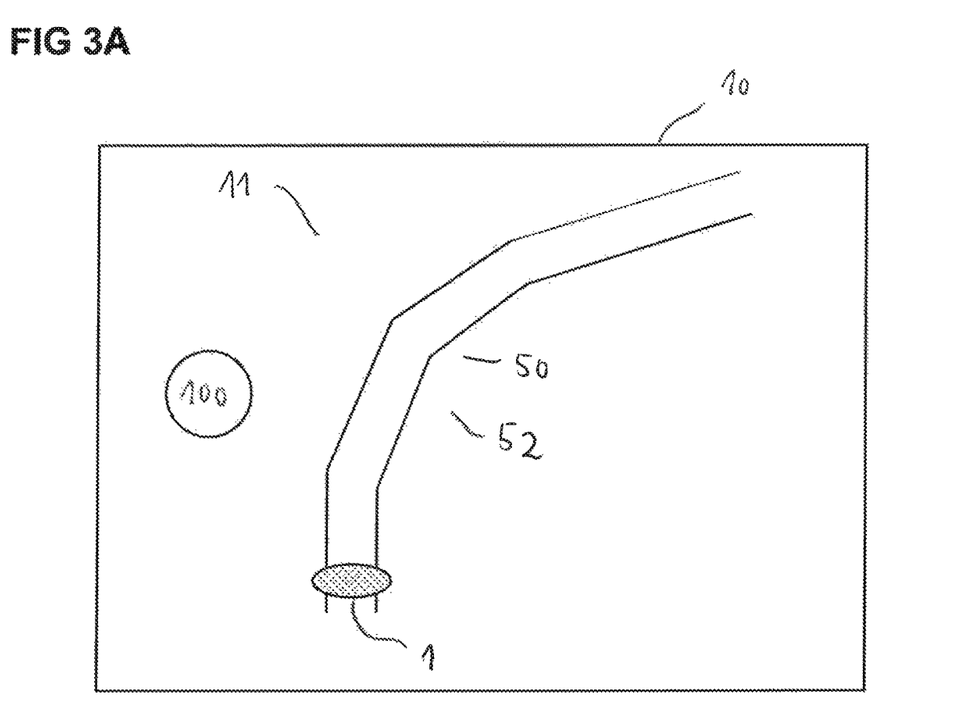
FIG. 3A shows the display of a route in a second presentation type on a display device in the presentation mode.

FIG. 3A shows a section 52 of the route 50, which is larger than in FIG. 2A, on the display device 10. The display device 10 is operated in the presentation mode 11. The section 52 of the route 50 is displayed in a second presentation type (focus switch level 2) over a length of several kilometers on the display device 10. In the example in FIG. 3A, the route section 52 of the route 50 is displayed in the navigation map presentation.

Figure 3B:
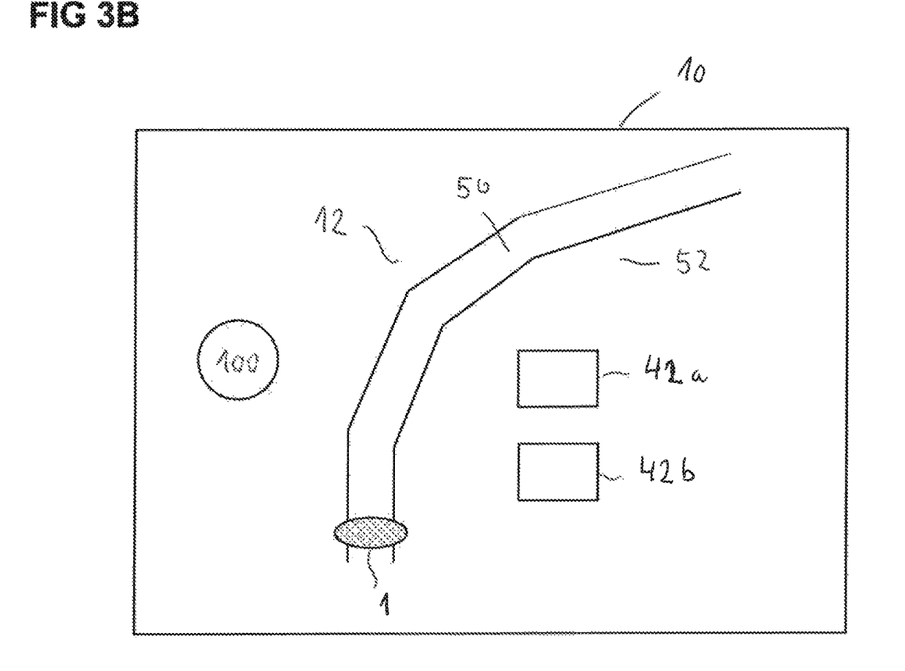
FIG. 3B shows a display of possible driving maneuvers for the second presentation type for the route on the display device in the input mode.

FIG. 3B shows the presentation type for the route 50 corresponding to the navigation map presentation in FIG. 3A in the input/maneuver mode 12 for selecting a driving maneuver 42a or 42b. The route section 52 of the route 50 over a length of several kilometers is again presented. As a possible driving maneuver 42a, a user is offered the option of stopping at a service area a few kilometers away from the current vehicle position. Another driving maneuver 42b which is displayed for selection is the option of leaving from an exit several kilometers away from the current vehicle position.

In the exemplary embodiment in FIG. 3B, when the display device 10 is operated in the input/maneuver mode 12, only those driving maneuvers which can be carried out in the near future with respect to the current vehicle position are displayed. These include, for example, the driving maneuver 42a, that is to say the stopping at a next service area for example, or the driving maneuver 42b, that is to say the leaving of a highway at the next exit for example. Those driving maneuvers which are carried out in an interval of time of more than one minute after they have been selected or are carried out only at a distance of more than one kilometer away with respect to the current vehicle position are displayed, for example.

Figure 4A:
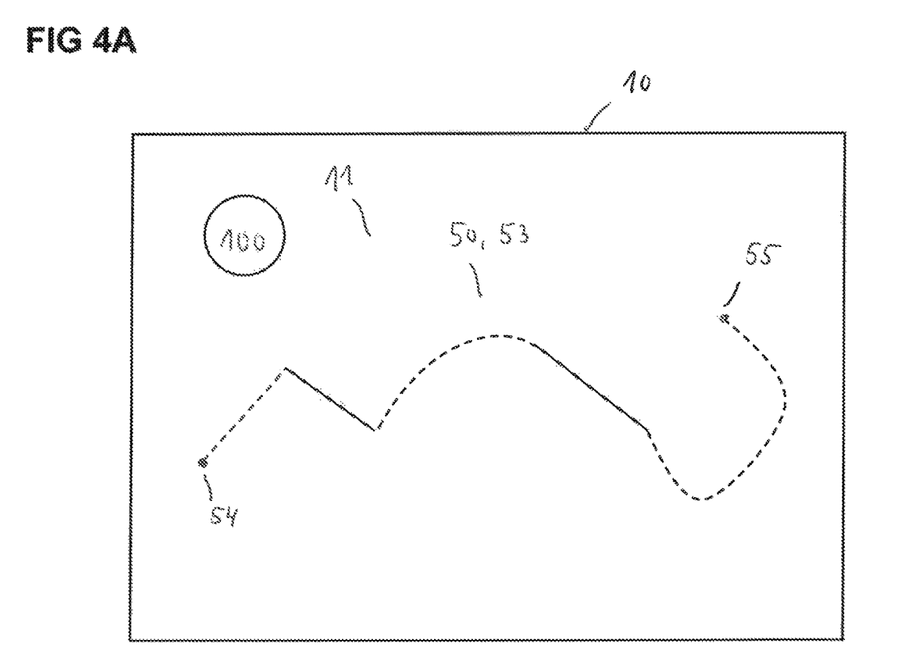
FIG. 4a shows the display of a route in a third presentation type on a display device in the presentation mode.

FIG. 4A shows the route 50 on the display device in the presentation mode in a third possible presentation type (focus switch level 3). The third presentation type shows the route 50 in the lowest magnification level, for example. In the third presentation type, the entire route 53 can be presented on the display device 10, for example (entire route presentation). In the exemplary embodiment in FIG. 4A, those sections of the entire route in which automated driving is possible are presented as solid lines, whereas automated driving is not possible in the route sections depicted using dashed lines.

Figure 4B:
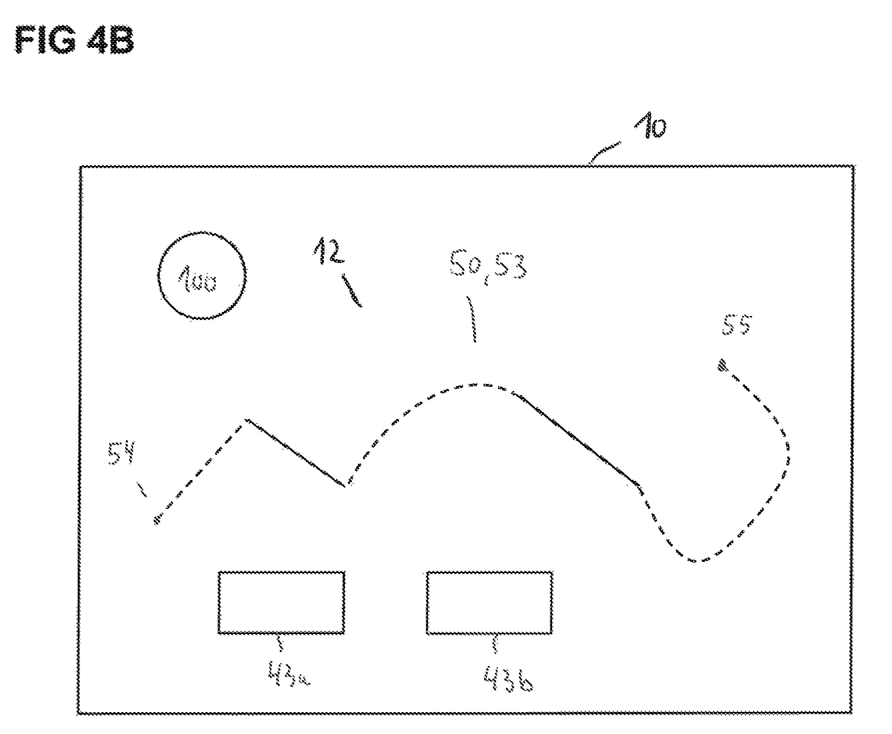
FIG. 4B shows a display of possible driving maneuvers for the third presentation type for the route on the display device in the input mode.

Whereas FIG. 4A shows the presentation of the route 50 in the presentation mode 11 in which no inputs can be made by a user of the system, FIG. 4B illustrates the display device 10 in the input/maneuver mode 12. In the input/maneuver mode 12, possible driving maneuvers 43a and 43b are presented as possible selection options for a user on the display device 10. As a driving option 43a for example, a user can select the situation in which the system drives in an automated manner as often as possible on the entire route. As a further possible driving maneuver 43b, a user can select the situation in which a vehicle moves in a manner which is as energy-saving as possible or moves at the maximum possible speed on the entire route, for example. In the third presentation type, those driving maneuvers which influence the entire route are offered to a user for selection in the input mode 12, for example.

As the exemplary embodiments stated above show, the display device 10 can be operated in the presentation mode 11 for presenting the route 50 in the different presentation types and can be operated in the input/maneuver mode 12 for selecting one of the driving maneuvers 41a, 41b, 42a, 42b, 43a, 43b. The selection device 20 is designed to select operation of the display device 10 in the presentation mode 11 and to select operation of the display device 10 in the input/maneuver mode 12. The selection device 20 may have, for example, an operating panel having buttons and/or a pushbutton and/or a rotary controller. It is also possible to integrate the selection device 20 in the display device 10. The display device 10 may be in the form of a touch-sensitive screen (touchscreen), for example.

The control device 30 is designed to present the route 50 in different presentation types, as shown by way of example in FIGS. 2A, 3A and 4A, on the display device 10 if the display device 10 is operated in the presentation mode 11. The control device 30 is also designed to display different possible driving maneuvers 41a, 41b, 42a, 42b and 43a, 43b for selection on the display device 10, as illustrated by way of example in FIGS. 2B, 3B and 4B, if the display device 10 is operated in the input mode 12. In this case, the driving maneuvers offered for selection are displayed in the presentation mode associated with the respective input/maneuver mode on the basis of the presentation type.

As shown in FIGS. 2A, 3A and 4A, the display device 10 is designed to depict the route 50 in different magnification levels as possible presentation types. The selection device 20 is designed to select one of the magnification levels/presentation types for the route 50. The control device 30 is designed to present the different possible driving maneuvers 41a, 41b, 42a, 42b and 43a, 43b for selection on the display device 10 on the basis of the selected magnification level if the display device 10 is operated in the input mode.

The display device 10 is designed, for example, to present a first route section 51 of the route 50 with an environment around the first route section on the display device 10 if the route 50 is presented with the first magnification level on the display device 10 and the display device 10 is operated in the presentation mode. Such a route section of the route 50 is presented on the display device 10 in FIG. 2A in the form of an environment visualization.

The display device 10 is also designed to present at least one second route section 52 of the route 50 with an environment around the second route section on the display device 10 if the route 50 is presented with the second magnification level on the display device 10 and the display device 10 is operated in the presentation mode. FIG. 3A illustrates, for example, a route section 52 of the route 50 on the display device 10 in the presentation mode 11, which route section is longer than the route section 51 in FIG. 2A.

The display device 10 is designed to present the environment around the first route section 51 of the route 50 with a greater degree of detail than the environment around the second section 52 of the route 50. For example, objects which are immediately in front of, beside or behind the vehicle 1 are presented in the presentation type in FIG. 2A. On the longer route section 52 of the route 50 illustrated in FIG. 3A, objects in an environment around this route section are displayed with a lower degree of detail. Exits, parking lots or service areas, for example, but not the immediate environment around the current vehicle position, are displayed.

The control device 30 is designed to display first maneuvers of the possible driving maneuvers 41a, 41b for selection on the display device 10 if the environment around the first route section 51 of the route 50 is presented on the display device 10 and the display device 10 is operated in the input/maneuver mode 12, as shown in FIG. 2B for example. The control device 30 is also designed to display second maneuvers of the possible driving maneuvers 42a, 42b for selection on the display device 10 if the environment around the second route section 52 of the route 50 is presented on the display device 10 and the display device 10 is operated in the input/maneuver mode 12. This situation is illustrated in FIG. 3B.

The first possible driving maneuvers 41a, 41b are those driving maneuvers which, after their selection, are carried out in a shorter time than the second possible driving maneuvers 42a, 42b during automated driving. The first possible driving maneuvers 41a, 41b are, in particular, those driving maneuvers which are carried out at a location closer to a current position of the vehicle 1 than the location at which the second possible driving maneuvers 42a, 42b are carried out.

According to another possible embodiment, the selection device 20 can be designed in such a manner that, in addition to the first and second levels of the magnification levels for the route 50, at least one third level of the magnification levels/presentation types for the route 50 can be selected using the selection device 20. The display device 10 is designed, in particular, in such a manner that an entire route 53 between a starting point 54 of the automated driving and a destination 55 of the automated driving is presented on the display device 10 if the third magnification level has been selected.

The control device 30 is designed to display third possible driving maneuvers 43a, 43b, which differ from the first and second possible driving maneuvers, for selection on the display device 10 if the entire route 53 is presented on the display device 10. The third possible driving maneuvers 43a, 43b are those driving maneuvers which relate to the entire route 53.

The invention claimed is:

1. A system for selecting driving maneuvers of a vehicle for automated driving, comprising:
 a display device for displaying a route of the vehicle in different presentation types,
 a selection device for selecting one of the presentation types for the route,
 a control device for controlling the display device,
 wherein the control device is designed to present different possible driving maneuvers for selection on the display device on the basis of the presentation type selected for the route,
 wherein the selection device is designed to select one of the different possible driving maneuvers for performance during automated driving, wherein the display device can be operated in a presentation mode for presenting the route in the different presentation types and can be operated in an input mode for selecting one of the driving maneuvers, wherein the selection device is designed to select operation of the display device in the presentation mode and to select operation of the display device in the input mode, wherein the control device is designed to display the route in the different presentation types on the display device if the display device is operated in the presentation mode, wherein the control device is designed to display the differently possible driving maneuvers for selection on the display device if the display device is operated in the input mode.

2. The system as claimed in claim 1, wherein the display device is designed to present the route with different magnification levels, wherein the selection device is designed to select one of the magnification levels for the route, wherein the control device is designed to present the differently possible driving maneuvers for selection on the display device on the basis of the selected magnification level if the display device is operated in the input mode.

3. The system as claimed in claim 2, wherein the selection device is designed such that a first and a second of the magnification levels for the route can be selected using the selection device, wherein the display device is designed to present a first section of the route with an environment around the first section of the route on the display device if the route is presented with the first magnification level on the display device and the display device is operated in the presentation mode, wherein the display device is designed to present a second section of the route with an environment around the second section of the route on the display device if the route is presented with the second magnification level on the display device and the display device is operated in the presentation mode, wherein the second section of the route presented on the display device is longer than the first section of the route.

4. The system as claimed in claim 3, wherein the display device is designed to present the environment around the first section of the route with a greater degree of detail than the environment around the second section of the route.

5. The system as claimed in claim 4, wherein the control device is designed to display first maneuvers of the possible driving maneuvers for selection on the display device if the environment around the first part of the route is presented on the display device and the display device is operated in the input mode, wherein the control device is designed to display second maneuvers of the possible driving maneuvers for selection on the display device if the environment around the second part of the route is presented on the display device and the display device is operated in the input mode.

6. The system as claimed in claim 5, wherein the first possible driving maneuvers are those maneuvers which, after their selection, are carried out in a shorter time than the second possible maneuvers during automated driving.

7. The system as claimed in claim 6, wherein the selection device is designed in such a manner that, in addition to the first and second levels of the magnification levels for the route, at least one third level of the magnification levels for the route can be selected using the selection device, wherein the display device is designed in such a manner that an entire route between a starting point of the automated driving and a destination of the automated driving is presented on the display device if the third magnification level is selected.

8. The system as claimed in claim 5, wherein the first possible driving maneuvers are those maneuvers which are carried out at a location closer to a current position of the vehicle than the location at which the second possible driving maneuvers are carried out.

9. The system as claimed in claim 8, wherein the selection device is designed in such a manner that, in addition to the first and second levels of the magnification levels for the route, at least one third level of the magnification levels for the route can be selected using the selection device, wherein the display device is designed in such a manner that an entire route between a starting point of the automated driving and a destination of the automated driving is presented on the display device if the third magnification level is selected.

10. The system as claimed in claim 9, wherein the control device is designed to display third possible driving maneuvers, which differ from the first and second possible driving maneuvers, for selection on the display device if the entire route is presented on the display device, wherein the third possible driving maneuvers are those maneuvers which relate to the entire route.

11. The system as claimed in claim 5, wherein the selection device is designed in such a manner that, in addition to the first and second levels of the magnification levels for the route, at least one third level of the magnification levels for the route can be selected using the selection device, wherein the display device is designed in such a manner that an entire route between a starting point of the automated driving and a destination of the automated driving is presented on the display device if the third magnification level is selected.

12. The system as claimed in claim 4, wherein the first possible driving maneuvers are those maneuvers which are carried out at a location closer to a current position of the vehicle than the location at which the second possible driving maneuvers are carried out.

13. The system as claimed in claim 12, wherein the selection device is designed in such a manner that, in addition to the first and second levels of the magnification levels for the route, at least one third level of the magnification levels for the route can be selected using the selection device, wherein the display device is designed in such a manner that an entire route between a starting point of the automated driving and a destination of the automated driving is presented on the display device if the third magnification level is selected.

14. The system as claimed in claim 4, wherein the selection device is designed in such a manner that, in addition to the first and second levels of the magnification levels for the route, at least one third level of the magnification levels for the route can be selected using the selection device, wherein the display device is designed in such a manner that an entire route between a starting point of the automated driving and a destination of the automated driving is presented on the display device if the third magnification level is selected.

15. The system as claimed in claim 2,
wherein the selection device is designed in such a manner that, in addition to the first and second levels of the magnification levels for the route, at least one third level of the magnification levels for the route can be selected using the selection device,
wherein the display device is designed in such a manner that an entire route between a starting point of the automated driving and a destination of the automated driving is presented on the display device if the third magnification level is selected.

16. The system as claimed in claim 15,
wherein the control device is designed to display third possible driving maneuvers, which differ from the first and second possible driving maneuvers, for selection on the display device if the entire route is presented on the display device,
wherein the third possible driving maneuvers are those maneuvers which relate to the entire route.

17. The system as claimed in claim 3,
wherein the selection device is designed in such a manner that, in addition to the first and second levels of the magnification levels for the route, at least one third level of the magnification levels for the route can be selected using the selection device,
wherein the display device is designed in such a manner that an entire route between a starting point of the automated driving and a destination of the automated driving is presented on the display device if the third magnification level is selected.

\* \* \* \* \*